US007311226B2

(12) United States Patent
Kado et al.

(10) Patent No.: US 7,311,226 B2
(45) Date of Patent: Dec. 25, 2007

(54) MIXED LIQUID DISPENSING APPARATUS

(75) Inventors: Shuuji Kado, Aichi (JP); Toshinari Hirakawa, Aichi (JP); Yushi Yonekura, Aichi (JP)

(73) Assignee: Hoshizaki Denki Kabushiki Kaisha, Aichi-ken (JP)

( * ) Notice: Subject to any disclaimer, the term of this patent is extended or adjusted under 35 U.S.C. 154(b) by 404 days.

(21) Appl. No.: 10/832,239

(22) Filed: Apr. 27, 2004

(65) Prior Publication Data

US 2004/0217130 A1 Nov. 4, 2004

(30) Foreign Application Priority Data

Apr. 30, 2003 (JP) ............................ 2003-125221

(51) Int. Cl.

| | |
|---|---|
| ***B67D 5/012*** | (2006.01) |
| ***B67D 5/052*** | (2006.01) |
| ***B67D 5/06*** | (2006.01) |
| ***B67D 3/00*** | (2006.01) |
| ***G01F 11/00*** | (2006.01) |
| ***B65D 25/04*** | (2006.01) |

(52) U.S. Cl. .................... 222/145.6; 222/75; 222/135; 222/263; 222/504; 222/496

(58) Field of Classification Search .................. 222/74, 222/75, 129.1, 132, 136, 144.5, 145.1, 145.5, 222/263, 145.6, 320, 335, 395, 504, 491, 222/496, 518
See application file for complete search history.

(56) References Cited

U.S. PATENT DOCUMENTS

| | | | | |
|---|---|---|---|---|
| 3,979,023 | A * | 9/1976 | Hartley | 222/61 |
| 3,993,218 | A * | 11/1976 | Reichenberger | 222/30 |
| 4,162,028 | A * | 7/1979 | Reichenberger | 222/129.4 |
| 4,619,378 | A * | 10/1986 | de Man | 222/144.5 |

* cited by examiner

*Primary Examiner*—Kevin Shaver
*Assistant Examiner*—Melvin A Cartagena
(74) *Attorney, Agent, or Firm*—Wenderoth, Lind & Ponack, L.L.P.

(57) ABSTRACT

A mixed liquid dispenser head (7) is provided with a carbonated water supply port (39), raw material exits (33), and a diluting water exit (35) within a head main body (11); a nozzle (13) that is attached to the head main body so as to cover the carbonated water supply port (39), the raw ingredient exits (33), and the diluting water exit (35); valve devices (49) that are provided in the raw ingredient exits and the diluting water exits and that open and close due to liquid pressure changes; a flow straightening plate (41) for making carbonated water discharged from the carbonated water supply port flow along an inner circumferential surface of the nozzle; and low pressure caps (57) and (59) provided for each of the raw ingredient exits and the diluting water exit and covering the raw ingredient exits and the diluting water exit together with the valve devices.

9 Claims, 8 Drawing Sheets

MIXED LIQUID DISPENSING APPARATUS

BACKGROUND OF THE INVENTION

1. Field of the Invention

The present invention relates to a mixed liquid dispensing head that mixes and dispenses a plurality of types of liquids.

2. Description of the Related Art

A carbonated beverage nozzle head for mixing carbonated water, diluting water, and a concentrated raw ingredient, and dispensing the mixture as a carbonated beverage, is disclosed in JP 2001-80700 A. The nozzle head is provided with a carbonated water nozzle, a plurality of syrup nozzles that are disposed in a circular shape centered around the carbonated water nozzle, and a nozzle cover that is attached so as to cover the syrup nozzles.

This type of carbonated beverage nozzle head is connected to a liquid storage tank through a supply hose. A beverage provider carries the liquid storage tank and operates the carbonated beverage nozzle head by hand, supplying an ordered carbonated beverage to a customer. Further, modes for controlling the beverage supply include one type in which opening and closing control is performed on a fluid passage by using an electromagnetic valve, and another type in which opening and closing control of the liquid passage is performed by using a mechanical valve upon which direct opening and closing forces are applied manually.

However, with the beverage supply control mode that uses the electromagnetic valve described above, the electromagnetic valve is normally disposed further upstream than the carbonated beverage nozzle head. Accordingly, the space between a liquid dispensing opening in the nozzle head and the electromagnetic valve is exposed to the air. Problems therefore exist in which the raw ingredients or water remaining in the exposed portion may later drip from the dispenser opening, and in which other liquids may flow backwards from the dispenser opening.

On the other hand, although the portion exposed to the air can be made smaller in the type that uses the mechanical valve compared to the type that uses the electromagnetic valve by disposing the mechanical valve within the carbonated beverage nozzle head, the liquid dispenser opening itself is exposed in the nozzle head, and the backward flow problem remains. In addition, the mechanical valve involves high opening and closing operating forces, and therefore a problem exists in that the effort required by the operator when supplying the carbonated beverage increases further.

SUMMARY OF THE INVENTION

The present invention has been made in view of the problems as described above. An object of the present invention is to provide a mixed liquid dispenser head having superior cleanliness, in which portions exposed to the air are reduced, and in which dripping and backwards flow can be prevented.

In order to achieve the object described above, a mixed liquid dispenser head of the present invention is provided with a plurality of types of liquid exits formed within a head main body, a nozzle that is attached to the head main body and covers the liquid exits, and a valve means that is formed in at least one type of the liquid exits and that is opened and closed by changes in liquid pressure.

DETAILED DESCRIPTION OF THE PREFERRED EMBODIMENTS

Figure 1:
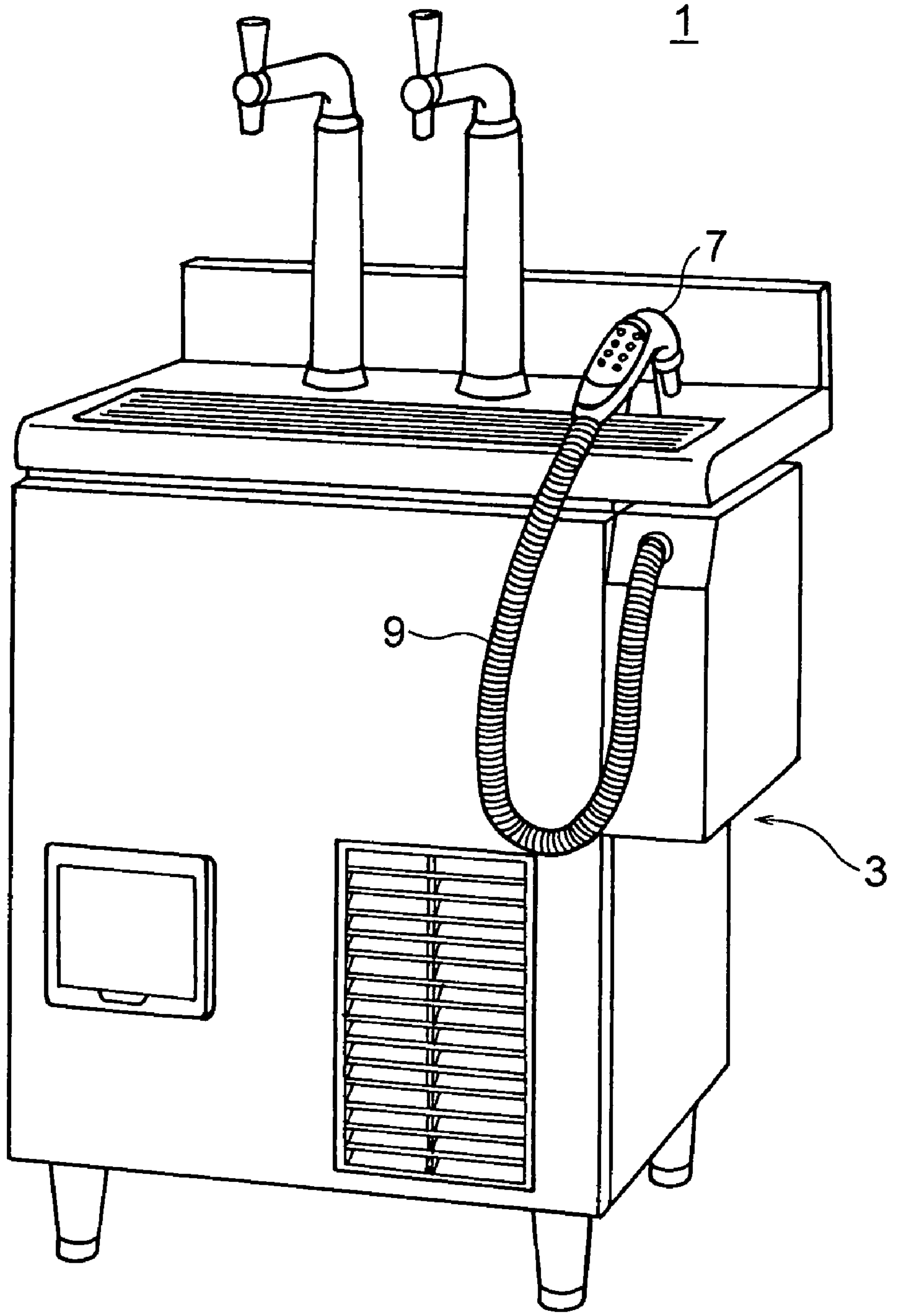
FIG. 1 is a perspective view that shows an outline of a carbonated beverage supplying apparatus that applies a mixed liquid dispenser head according to an embodiment of the present invention.

An embodiment of the present invention in which a mixed liquid dispenser head of the present invention is used as a carbonated beverage dispenser head in a post mixing type carbonated beverage supplying apparatus will be described below based on the appended drawings. FIG. 1 shows a carbonated beverage supplying apparatus. A supplying apparatus 1 comprises a casing 3 that is provided with a plurality of containers that store carbonated water, raw ingredients, diluting water, or the like that constitute a carbonated beverage, a carbonated beverage dispenser head 7 that dispenses the carbonated beverage, and a supply hose 9 that is connected to the casing 3 and to the carbonated beverage dispenser head 7.

Figure 2A:
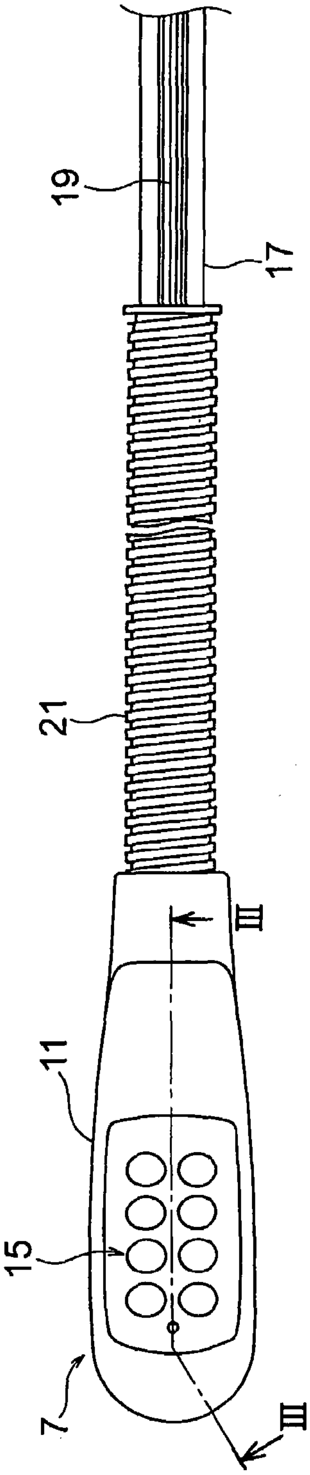
FIGS. 2A and 2B are a plan view and a side view, respectively, of the mixed liquid dispenser head according to the embodiment.
Figure 2B:
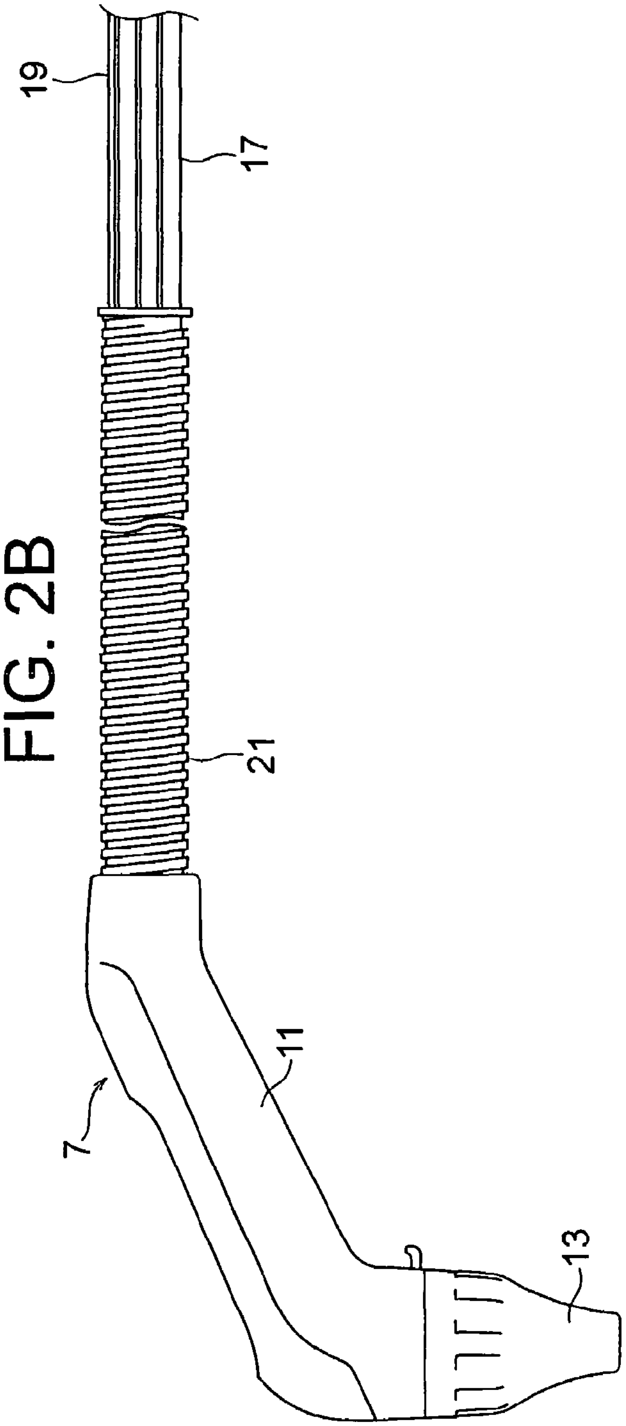

As shown in FIGS. 2A and 2B, the carbonated beverage dispenser head 7 comprises a head main body 11 and a nozzle 13 that is attached to a distal end of the head main body 11. The head main body 11 is of a shape that is easy for a beverage provider to hold by hand, and a plurality of operation switches 15 are provided on an upper surface of the head main body 11. The beverage provider selects and supplies a beverage desired by a customer from among a plurality of beverages that correspond to the plurality of raw ingredients by operating the switches 15. A plurality of polyester hoses 17 and signal cables 19 extend from a base end side of the head main body 11 toward the casing 3. The polyester hoses 17 supply the carbonated water, the raw ingredients, and the diluting water corresponding to a carbonated beverage from the casing 3 to the carbonated beverage dispenser head 7. Further, the signal cables 19 send operation signals input by the switches 15 to a control portion. The control portion controls opening and closing of electromagnetic valves (not shown) that are disposed in each of the polyester hoses 17, based on the operation signals. Furthermore, the polyester hoses 17 and the signal cables 19 are covered by, and protected by, stainless steel conduits 21 so that splitting, cracking, and breakage may not develop.

Inside structures of the head main body 11 and the nozzle 13 will be described next based on FIG. 3, FIG. 4, and FIGS. 5A and 5B. A carbonated water nipple 23, raw ingredient nipples 25, and a diluting water nipple 27 are fixed to the inside of the head main body 11, through a plate 29. O-rings 31 effect sealing between the main body 11 and the nipples 23, 25, and 27. Further, in this embodiment, six raw ingredient nipples 25 and one diluting water nipple 27 are disposed so that centers thereof are located on the same peripheral circumference, taking one carbonated water nipple 23 as a center. An end portion of each of the polyester hoses 17 is connected to a base end portion of one of the nipples 23, 25, and 27.

Further, downward projecting portions 11*a* that define raw ingredient exits 33 and a diluting water exit 35, which constitute liquid exits, are provided in the head main body 11 in portions below the raw ingredient nipples 25 and the diluting water nipple 27, respectively. In addition, the head main body 11 has a recess defining portion 37 that defines a cylindrical recess that opens downward in a portion below the carbonated water nipple 23. The recess defining portion 37 is provided with a truncated conical side surface having a slight incline that expands downward. The cylindrical recess that is defined by the recess defining portion 37 is aligned coaxially with a carbonated water supply port 39 formed as one liquid exit. The carbonated water supply port 39 is provided in a lower end of the carbonated water nipple 23.

Figure 4:
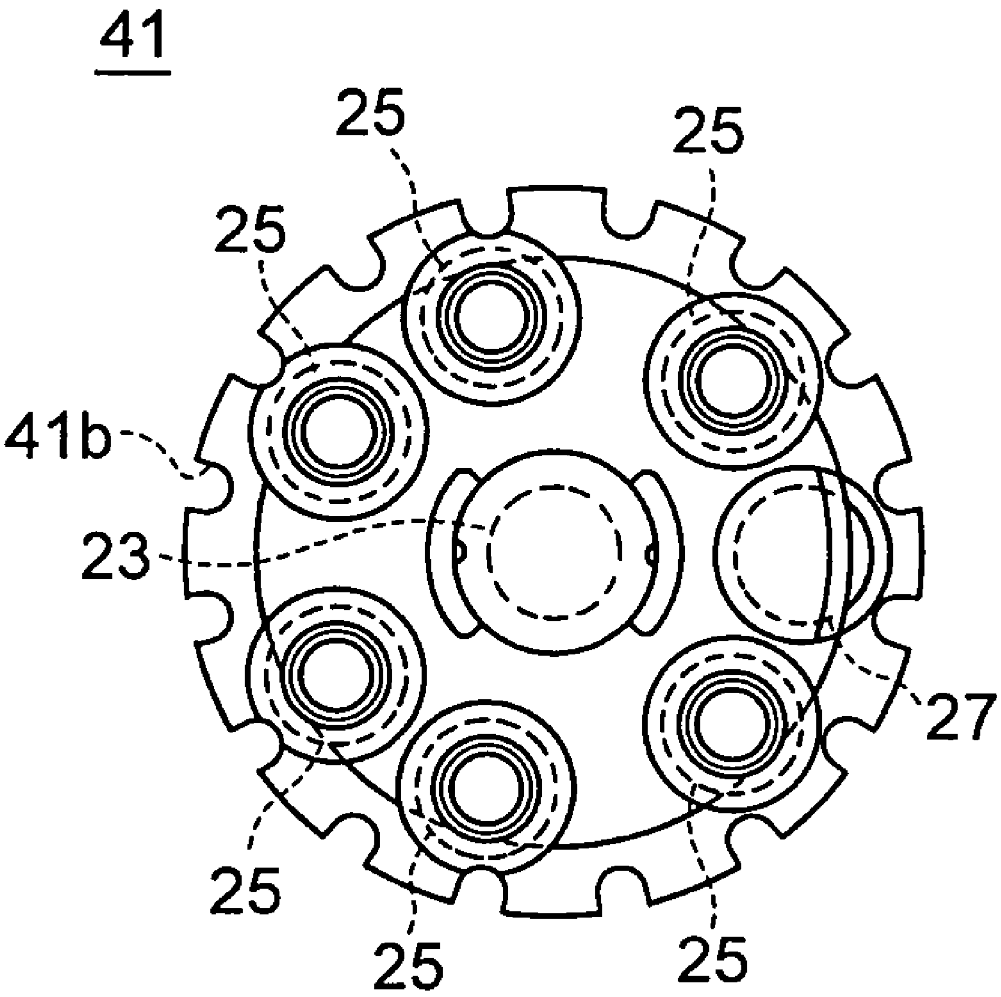
FIG. 4 is a diagram of a flow straightening plate as seen from below, that is, as seen from an arrow IV direction in FIG. 3, the flow straightening plate being provided on the mixed liquid dispenser head according to the embodiment.
Figure 5A:
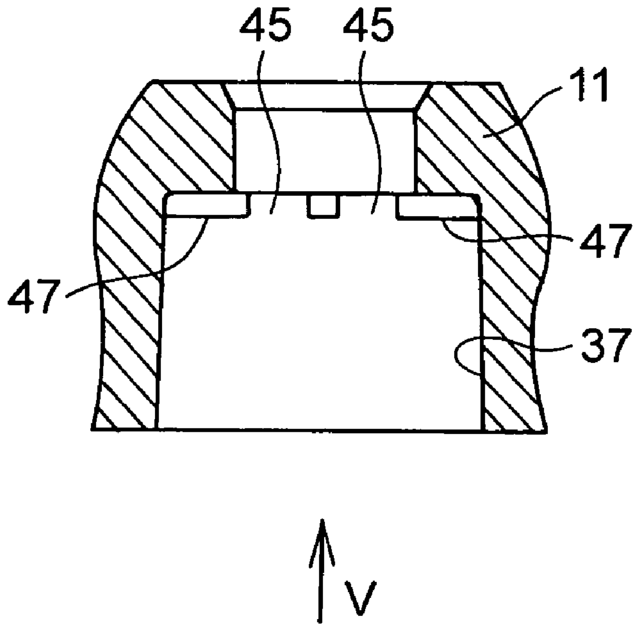
FIG. 5A is a diagram that shows the vicinity of a recess defining portion in a mixed liquid dispenser head.
Figure 5B:
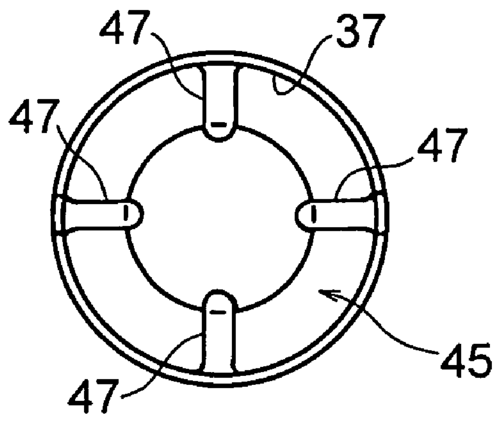
FIG. 5B is a diagram of FIG. 5A as seen from the direction of arrow V.

Further, a flow straightening plate 41 for making the carbonated water discharged from the carbonated water supply port 39 flow along an annular inner circumferential surface 13*a* of the nozzle 13 is provided within the nozzle 13, below the bead main body 11. The flow straightening plate 41 is joined to an annular shoulder portion 13*b* that is provided on the inner circumferential surface 13*a* of the nozzle 13, and is held by the head main body 11 from above. Thus, the flow straightening plate 41 is sandwiched between the shoulder portion 13*b* and the head main body 11. Further, holes into which the projecting portions 11*a* of the head main body 11 are inserted are formed in the flow straightening plate 41. That is, the raw ingredient exits 33 and the diluting water exit 35 are located lower than (downstream side with respect to the dispensing direction) a flow straightening surface 41*a* constituting the upper surface of the flow straightening plate 41. Furthermore, a plurality of U-shape groves 41*b* that extend in the dispensing direction are formed in an annular outside surface of the flow straightening plate 41 as shown in FIG. 4. A flow path for the carbonated water between the flow straightening plate 41 and the inner circumferential surface 13*a* of the nozzle 13 is thus assured. In this embodiment, the U-shape grooves 41*b* are disposed so as to be separated at an equal spacing in a circumferential direction. In addition, a resistive member (cone) 43 inserted within the recess, which is defined by the recess defining portion 37 of the head main body 11, is mated to the center of the flow straightening plate 41 through a roughened means. Crisscrossing grooves are formed in an outer surface of a cylindrical portion of the resistive member 43 that is inserted into the recess. Further, four ribs 47 project downward from an upper surface of the recess defining portion 37 in the head main body 11, as shown in FIG. 5. Each of the ribs 47 extends along a radial direction, and is separated from adjacent ribs 47 at a spacing of approximately 90 degrees. A surplus space 45 for making the carbonated water flow uniformly is thus assured in a portion between an upper surface of the resistive member 43 and the recess defining portion 37, that is, below the carbonated water supply port 39.

Figure 3:
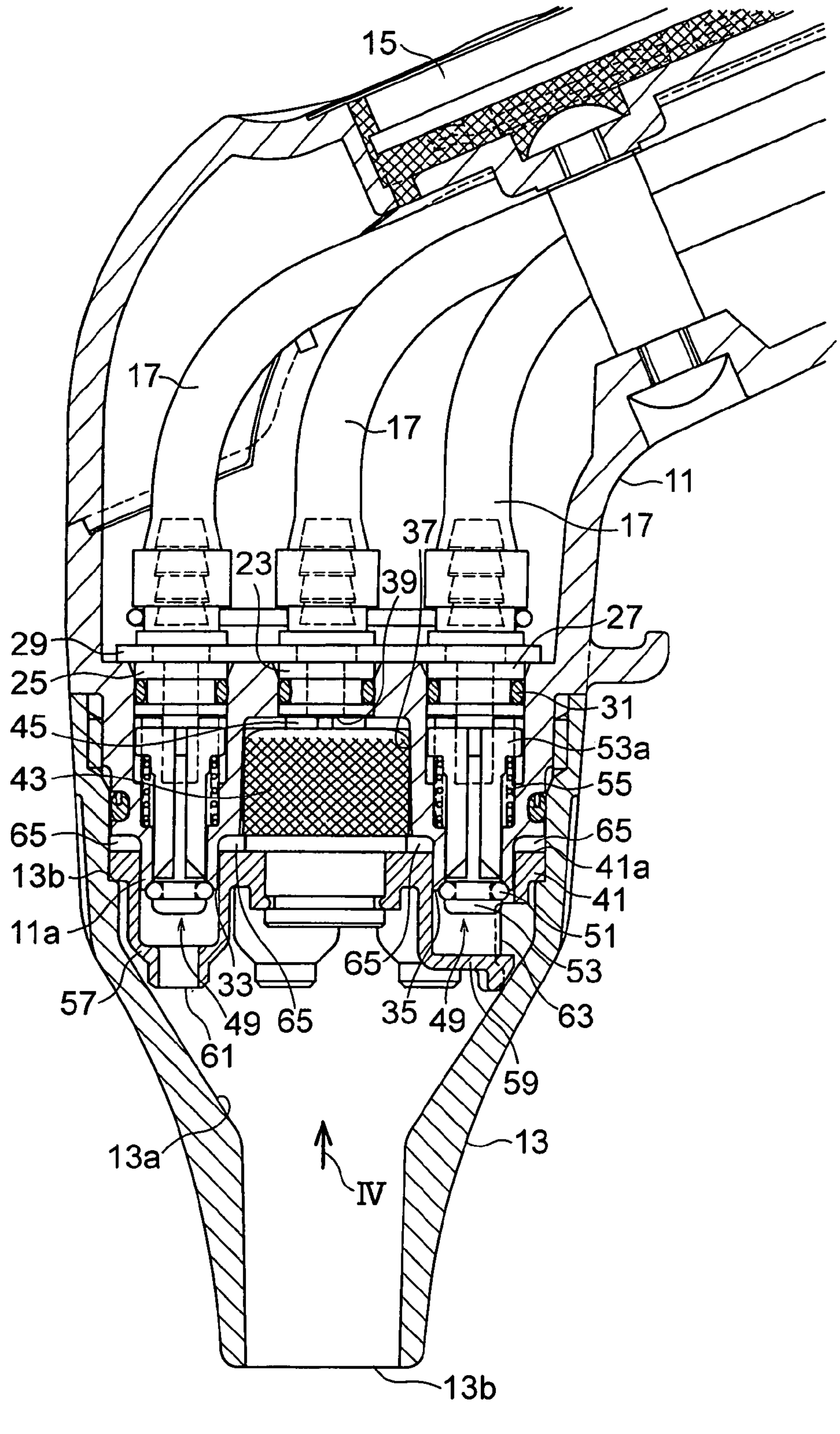
FIG. 3 is a cross sectional view of FIG. 2A taken along a line segment III-III and shows a head main body distal end portion and a nozzle portion.

As shown in FIG. 3, a valve means 49 is provided in each of the raw ingredient exits 33 and in the diluting water exit 35 for opening and closing exits. Each of the valve means 49 is provided with a valve body 53 that can be mated to the corresponding raw ingredient exit 33 or the diluting water exit 35, through an O-ring 51, and a coil spring 55 that imparts a closing force to the valve body 53. A lower side of the coil spring 55 latches onto the shoulder portion above the projecting portion 11*a* of the head main body 11. An upper end of the coil spring 55 is joined with a bearing portion 53*a* having a cross shape transverse section in the valve body 53. The valve body 53 is thus supported in a completely closed state provided that a liquid force great enough to overcome the elastic force of the O-ring 51 is not imparted. Further, the portions below each of the raw material exits 33 and the diluting water exit 35 in the flow straightening plate 41 are configured as low pressure caps 57 and 59. The low pressure caps 57 cover the raw material exits 33 and the corresponding valve bodies 53, and each has a raw material discharge opening 61 that opens downward. On the other hand, the low pressure cap 59 covers the diluting water exit 35 and the corresponding valve body 53. The low pressure cap 59 has a diluting water discharge opening 63 that opens laterally and outwardly in a radial direction.

Operation of the carbonated beverage supply apparatus 1 and the carbonated beverage dispenser head 7 having the construction described above will be described next. When the beverage provider, who is holding the carbonated beverage dispenser head 7 by hand, receives an order for a beverage from a customer, the provider operates the switches 15 corresponding to the beverage ordered. The corresponding electromagnetic valve thus opens, and the carbonated water, the raw ingredients, and the diluting water within the casing 3 are thus supplied to the nipples 23, 25, and 27, respectively, through the corresponding polyester hoses 17.

The carbonated water that is supplied to the carbonated water nipple 23 within the head main body 11 is supplied to the surplus space 45, through the supply port 39. The carbonated water flows uniformly in the outer circumferential surface of the resistive member 43 due to the surplus space 45, and flows down the annular gap between the recess defining portion 37 and the resistive member 43. The carbonated water thus reduces in pressure and is made uniform by flowing from the surplus space 45 and through the gap between the recess defining portion 37 and the resistive member 43, which has the crisscrossing grooves. The carbonated water then flows into a space 65 between the flow straightening surface 41*a* of the flow straightening plate 41 and the head main body 11. The carbonated water within the space 65 flows radially in an outward direction along the flow straightening surface 41*a*, and is discharged out below the flow straightening plate 41 along the U-shape grooves 41*b* on the outer surface of the flow straightening plate 41. The carbonated water is discharged radially outward through the U-shape grooves 41*b*, and therefore carbonated water having a high enough gas volume needed in preparing highballs, cocktails and other mixed drinks, which are enjoying greater popularity among consumers in recent years, can be dispensed.

Figure 6:
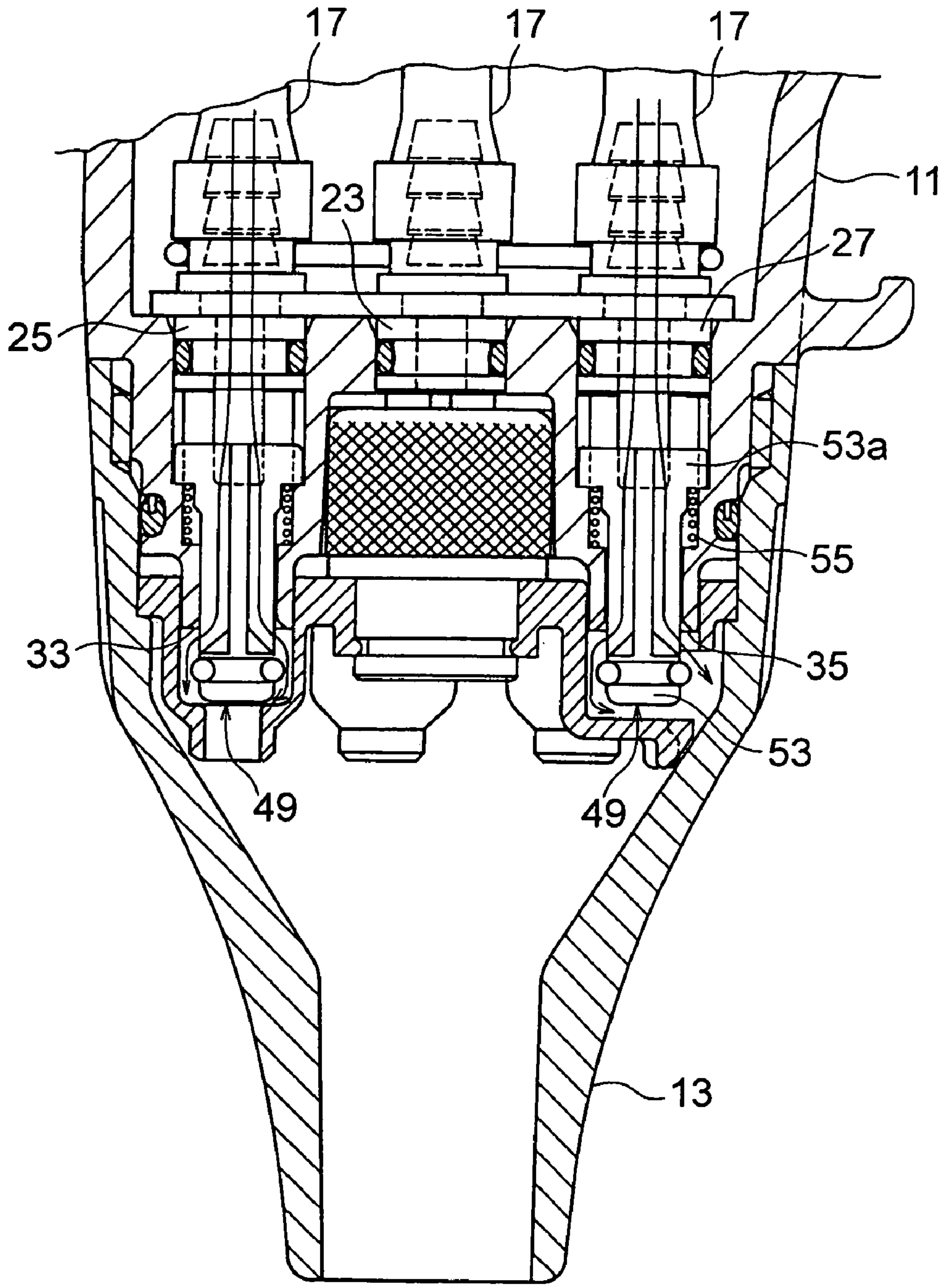
FIG. 6 is a diagram that shows a state in which a valve means in a mixed liquid dispenser head is open.

On the other hand, dispensing of the raw ingredients and the diluting water can also be performed in parallel with the carbonated water. That is, the raw ingredients and the diluting water that are supplied to the raw ingredient nipples 25 and the diluting water nipple 27, respectively, apply pressure in a valve opening direction to the corresponding valve bodies 53. When the liquid pressure becomes equal to or greater than a predetermined value due to the raw ingredients and the diluting water continuing to be force fed from the casing 3, the valve bodies 53 resist against the coil springs 55, and separate from the raw ingredient exits 33 and the diluting water exit 35, as shown in FIG. 6. When each of the valve means 49 is thus opened, the raw ingredients and the diluting water flow through the raw ingredient exits 33 and the diluting water exit 35, respectively, and are discharged from the raw ingredient discharge openings 61 and the diluting water discharge opening 63, respectively. It should be noted that the raw ingredient exits 33 and the diluting water exit 35 are located below the flow straightening surface 41*a* of the flow straightening plate 41 at this point. Therefore the carbonated water passage does not become contaminated, and the gas volume of the carbonated water is not reduced.

Further, in general, the raw ingredients are discharged in a jet state (misting state) if the viscosity thereof is low, and there is a danger that the carbonating gas volume of the beverage will drop when mixing occurs while the raw ingredients are impacting the carbonated water because carbonating gas separates (foams). By providing the low pressure caps 57 in this embodiment, however, the raw materials ultimately form a filament shape and can be discharged downward, even if the raw materials initially jet out. Further, the diluting water generally tends to diffuse in a concentric circular shape after discharge. In this embodiment, however, the diluting water is discharged from the laterally directed diluting water discharge exit 63 of the low pressure cap 59, along the inner circumferential surface 13*a* of the nozzle. Accordingly, uniform mixing between the diluting water and the concentrated raw ingredients can be performed.

As described above, the carbonated water, the raw ingredients, and the diluting water from their respective passages are mixed in the inside of the nozzle 13 immediately before being dispensed. The mixture is then dispensed as a carbonated beverage from the dispensing opening 13*b* of the nozzle 13. A variety of carbonated beverages made from carbonated water, a plurality of concentrated raw ingredients, and diluting water can thus be dispensed by one nozzle, and mutual mixing between high gas volume carbonated beverages and a plurality of beverages does not occur during dispensing. Further, the raw ingredient exits 33 and the diluting water exit 35 are closed by the valve bodies 53 when drink dispensing is stopped, that is, when the liquid pressure of the raw ingredients and the diluting water is low. Accordingly, portions upstream of the raw ingredient exits 33 and the diluting water exit 35 are not exposed to the air. Further, there is no back flow of other beverage liquids, detergents, and the like from the outside. A state having superior cleanliness can thus be maintained. In addition, liquids that remain between the electromagnetic valves and the raw ingredient exits 33 or the diluting water exit 35 do not unnecessarily leak out, and so-called later dripping can be prevented. Furthermore, the nozzle 13 is removed from the head main body 11 during maintenance, and in addition, the flow straightening plate 41 is also removed. Cleaning is therefore easy, and this is preferable from a hygiene standpoint.

Figure 7:
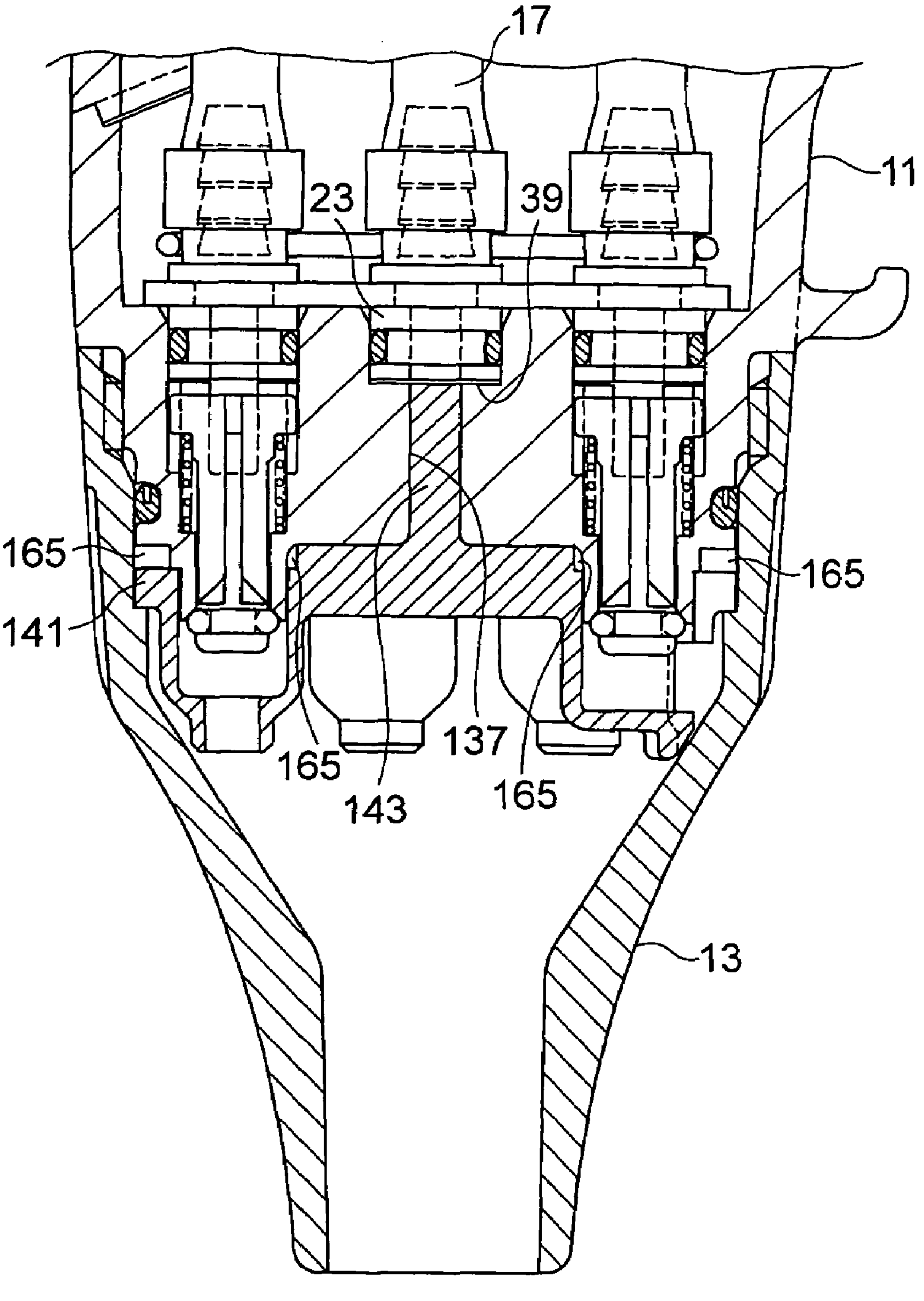
FIG. 7 is a diagram similar to FIG. 3, but according to another embodiment of the invention.

The present invention as described above is not limited to the embodiment described, and it is possible to make a variety of improvements to the present invention. In the embodiment described above, a mode is employed in which the resistive member 43 is mated and fixed to the flow straightening plate 41, through the roughened means, in consideration of ease in assembly. A construction in which the resistive member and the flow straightening plate are built in separate steps may also be used. Further, the present invention is not limited to always using a cone type resistive member. For example, a configuration as shown in FIG. 7 may also be employed. That is, a cylindrical recess may be defined by a recess defining portion 137 below the supply port 39 of the carbonated water nipple 23. A filler portion 143 that extends upward and is formed integrally in the center of a flow straightening plate 141 may be inserted into the recess. In this configuration, carbonated water that flows out from the carbonated water supply port 39 passes through a gap between the recess defining portion 137 and the filler portion 143, and flows into a space 165 between the head main body 11 and the flow straightening plate 141. The carbonated water is then discharged downward through a U-shape groove formed in the flow straightening plate 141. Effects similar to those obtained by the embodiment described above can also be produced by this type of configuration. Further, in the embodiment described above, the low pressure caps 57 and 59 are formed integrally with the flow straightening plate 41 as portions of the flow straightening plate 41, but the present invention is not limited to this configuration. It is also possible to prepare the low pressure caps as members that are separate from the flow straightening plate. In addition, a sufficient viscosity is present for beverages whose concentrated raw ingredients have a sugar content equal to or greater than 40 percent, and the embodiment will work even if the low pressure caps are not provided. It is therefore possible to implement a configuration that does not have the low pressure caps, as well as a configuration in which the low pressure caps are removed.

Furthermore, the present invention is not limited to the formation of the liquid exits as the raw ingredient exits, the diluting water exit, and the carbonated water supply entrance as suitable improvements can also be made. Further, suitable improvements may also be made in the location and number of the raw ingredient exits, the diluting water exit, and the carbonated water supply entrance. In addition, the invention is not limited to always providing the valve means in all of the raw ingredient exits and in the diluting water exit. It is also possible to implement a configuration that differs from the embodiment described above, as long as the valve means is provided in at least one of the liquid exits.

Figure 8:
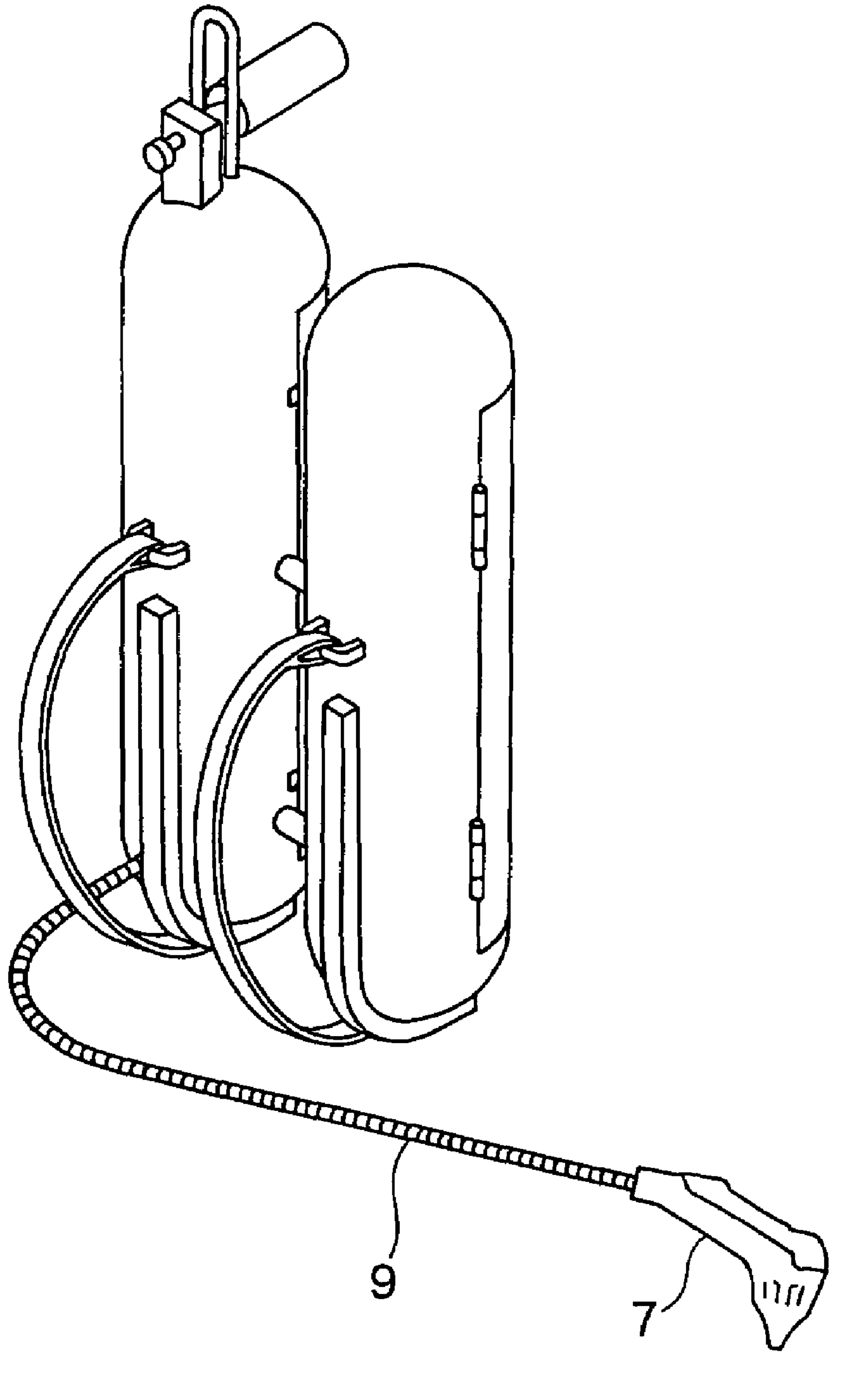
FIG. 8 is a perspective view that shows an outline of a carbonated beverage supplying apparatus according to a further embodiment of the invention.

Further, the mixed liquid dispenser head of the present invention is not limited to being applied to a stationary carbonated beverage supply apparatus. The mixed liquid dispenser head can be widely applied to dispenser mechanisms in mixed drink dispenser apparatuses, such as a portable type carbonated beverage supply apparatus as shown in FIG. 8. Note that the beverage provider moves about and performs supply while carrying storage containers with a carrying type carbonated beverage supply apparatus like that of FIG. 8. Therefore, the provider can experience a reduction in the effort required by lightening the operative forces needed for dispensing and for stopping dispensing.

What is claimed is:

1. A mixed drink dispenser head comprising:

a head main body including a recess defining portion that defines a recess;

a plurality of liquid exits provided within the head main body;

a nozzle mounted to the head main body and covering the liquid exits;

a valve means provided in at least one of the plurality of liquid exits, for opening and closing the at least one of the plurality of liquid exits in response to a liquid pressure change; and a flow straightening plate for making carbonated water discharged from the carbonated water supply port flow along an inner circumferential surface of the nozzle, the flow straightening plate being sandwiched and held between the head main body and the nozzle; and a resistive member including an outer surface provided with grooves, the resistive member being inserted within the recess defining portion such that the carbonated water flows from the carbonated water supply port to an inner circumferential surface of the nozzle through a gap between the recess defining portion and an outer surface of the resistive member.

2. A mixed drink dispenser head according to claim 1, wherein the liquid exits comprise a carbonated water supply port, raw ingredient exits, and a diluting water exit, and wherein the valve means is provided with a valve body that opens, due to liquid pressure, from each of the raw ingredient exits and the diluting water exit.

3. A mixed drink dispenser head according to claim 1, further comprising a low pressure cap in each of the liquid exits to which the valve means is provided, the low pressure cap covering the valve means and the liquid exits.

4. A mixed drink dispenser head according to claim 1, wherein the flow straightening plate has a flow straightening surface, and wherein the raw ingredient exits and the diluting water exit are disposed in the flow straightening plate further downstream than the flow straightening surface in a dispensing direction.

5. A liquid dispenser head comprising:

a head main body including a recess defining portion that defines a recess;

a plurality of liquid exits provided within the head main body;

a nozzle mounted to the head main body and covering the liquid exits, the nozzle having an annular shoulder portion provided on an inner circumferential surface thereof:

a valve provided in at least one of the plurality of liquid exits, for opening and closing the liquid exit in response to a liquid pressure change;

a flow straightening plate disposed on the annular shoulder of the nozzle, the flow straightening plate including an annular outside surface defining a plurality of grooves for permitting carbonated water, that has been discharged from the carbonated water supply port, to flow along the inner circumferential surface of the nozzle, wherein the flow straightening plate is sandwiched and held between the head main body and the nozzle; and a resistive member including an outer surface with grooves, the resistive member being inserted within the recess defining portion such that a gap is formed between the recess defining portion and the outer surface of the resistive member, wherein, during a dispensing operation, carbonated water flows from the carbonated water supply port, through the gap, and to an inner circumferential surface of the nozzle.

6. A liquid dispenser head according to claim 5, wherein the liquid exits comprise a carbonated water supply port, raw ingredient exits, and a diluting water exit.

7. A liquid dispenser head according to claim 6, wherein the flow straightening plate has an upper flow straightening surface, and wherein the raw ingredient exits and the diluting water exit are disposed in the flow straightening plate further downstream than the upper flow straightening surface in a dispensing direction, and each of the raw ingredient exits and the diluting water exits is provided with a valve.

8. A liquid dispenser head according to claim 5, wherein the flow straightening plate further comprises a low pressure cap at the liquid exit in which the valve is provided, the low pressure cap covering the valve and the corresponding liquid exit.

9. A liquid dispenser head according to claim 5, wherein the head main body includes projecting portions that define the liquid exits, respectively, and the projecting portions extend into holes formed in the flow straightening plate.

* * * * *